(No Model.)
I. S. WILSON.
PLANING ATTACHMENT FOR SAWS.
No. 474,492. Patented May 10, 1892.
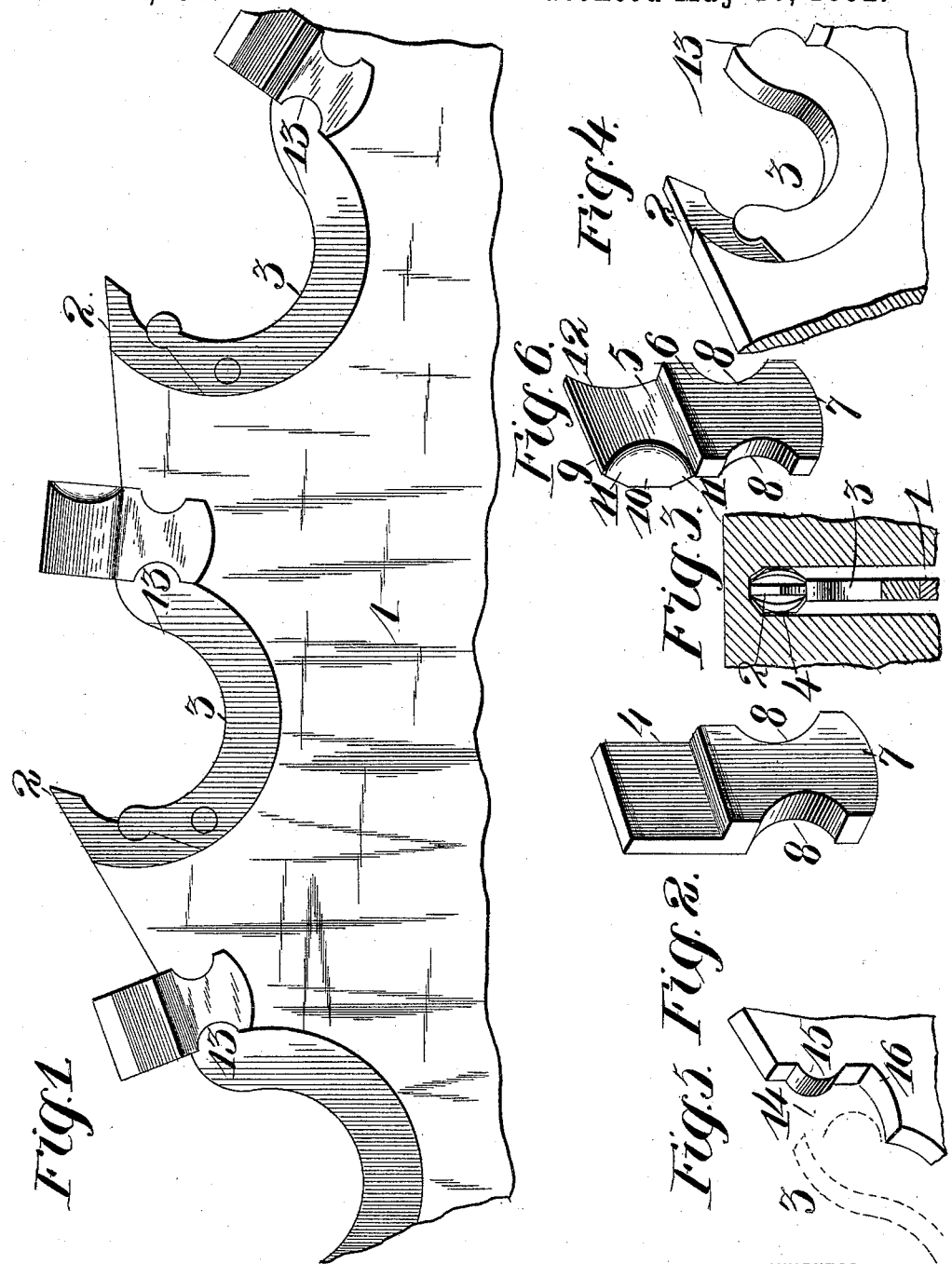
WITNESSES:
INVENTOR
Isaac S. Wilson.
BY
ATTORNEYS.

UNITED STATES PATENT OFFICE.

ISAAC S. WILSON, OF CEDAR GAP, MISSOURI.

PLANING ATTACHMENT FOR SAWS.

SPECIFICATION forming part of Letters Patent No. 474,492, dated May 10, 1892.

Application filed July 2, 1891. Serial No. 398,233. (No model.)

*To all whom it may concern:*

Be it known that I, ISAAC S. WILSON, of Cedar Gap, in the county of Wright and State of Missouri, have invented certain new and useful Improvements in Planing Attachments for Saws, of which the following is a full, clear, and exact description, reference being had to the accompanying drawings, forming a part hereof.

My invention relates to improvements in planing attachments for circular saws provided with insertible teeth; and it consists in the novel arrangement and combination of parts, as will be more fully hereinafter described, and designated in the claims.

In the drawings, Figure 1 is a side elevation of a circular saw, showing my invention applied thereto. Fig. 2 is a perspective view of a planing-tooth, which I employ in carrying out my invention, as manufactured and before the same has been shaped for use. Fig. 3 is a sectional view of a piece of timber, showing the location of the circular saw and planing-teeth located in the kerf thereof. This figure is especially to illustrate the use of an insertible tooth of less thickness than the body of the saw. Fig. 4 is a perspective view of a circular saw, with parts broken away, showing the manner by which the insertible teeth are fastened in the saw, and also showing an insertible tooth thinner than the body of the saw. Fig. 5 is a perspective view of a saw, with the parts broken away, showing the recess in which the planing-knives are placed and secured, in the manner as will be more fully hereinafter described. Fig. 6 is a perspective view showing the planing-knife shaped ready for use.

The object of my invention is to provide an attachment for circular saws for planing the lumber simultaneously with sawing the same.

I will further describe the use and object of my invention, in connection with the mechanical description thereof.

Referring to the drawings, 1 indicates a circular saw of ordinary construction, the same being provided with insertible saw-teeth 2. Said saw-teeth 2 are secured in their appropriate location in the saw by means of a semicircular metallic piece 3 in any well-known and mechanical manner.

I will now proceed to describe the construction and manner of securing the planing-knives to the circular saw 1.

4 indicates the planing-knife as it is manufactured, and 5 indicates the same when shaped ready for use. The form of the planing-knife as manufactured is fully illustrated in Fig. 2, and the form of knife as shaped ready for use by the sawyer is fully illustrated in Fig. 6, wherein said cutting-knife is shown provided with a stem 6, the same having a rounded portion 7 and hollowed-out semicircular portions 8.

9 indicates the blade of the knife, which is provided with a plane cutting-edge 10 and inclined cutting-edges 11, and with a hollowed out curved portion 12.

The stem 6 of the knives is of the same thickness of the saw 1.

Having given a general description of the construction and shape of the planing-knives, I will now proceed to describe the manner in which they are secured to the saw.

In order to comprehend the manner of securing the planing-knives to the saw, I will first describe the construction of the semicircular metallic piece 3, by which the insertible saw-teeth 2 are secured to the saw. Said semicircular metallic piece 3 is provided with a rounded projection 13, which is adapted to fit in the hollowed out semicircular recesses 8. It also may be premised in this connection that the saw 1 is provided at the rear of each semicircular metallic piece 3 with recesses 14, as illustrated in Fig. 5, and projecting from each of said recesses is a rounded projection 15, adapted to fit in a semicircular recess 8. To be more specific, the rounded projections 13 and 15 are adapted to fit in the semicircular recesses 8. It may be also stated in this connection that the recess 14 is provided with a rounded surface 16, corresponding to the rounded portion 7 of the planing-knives, and also that the semicircular metallic piece 13 is so constructed that it is adapted to clamp and wedge the insertible saw-teeth 2 and also the planing-knives 5 in their appropriate location in the circular saw 1.

By referring to Fig. 6 it can be readily perceived that the cutting-edges 10 and 11 of the blade 9 of the planing-knives 5 project beyond the stem 6, or, in other words, are not flush with the side of the circular saw, and that said planing-knives will cut the kerf wider than the original kerf made by the saw-teeth. The cutting-edges of the planing-knives occupy opposite positions at every alternate tooth.

To be more specific, referring to Fig. 1 for illustration, and especially referring to the planing-knife farthest toward the left in said figure, said planing-knife has its cutting-edge placed or turned toward the observer, while the one to the right next to said knife has its cutting-edge oppositely located. By this location of the planing-knives, or especially the cutting-edges of the same, both the face of the plank that is sawed off and also the face of the log may be planed and smoothed. It may also be observed in this connection that the insertible saw-teeth 2 project a little beyond the edges of the blades of the planing-knives, or, in other words, the circle described by the sharpened points of the insertible saw-teeth 2 has a greater diameter than the circle described by the edge of the planing-knives. I will also state in this connection that the insertible saw-teeth 2 are of a different construction than those ordinarily in use, in that they are thinner than the saw, as illustrated in Figs. 3 and 4; but the planing-knives widen the kerf, so as to permit the saw to freely move in the kerf By using the planing-knives it is not absolutely necessary to set the saw-teeth for the purpose of making the kerf wider than the thickness of the saw, as this is accomplished by the planing-knives.

Although it may be observed that I have shown the planer-teeth as applied to a circular saw, yet I desire to state that I can extend the same principle of construction and application to a band-saw or any other saw.

Having fully described my invention, what I claim is—

1. In a saw, the combination, with a planing-knife and an insertible saw-tooth, of a single key or semicircular piece engaging both parts, whereby they are jointly locked, substantially as set forth.

2. In a saw, the combination, with a planing-knife and an insertible tooth, of a single key or semicircular piece engaging both parts, whereby said parts are fastened one at each end of said key or piece, substantially as set forth.

3. As a new article of manufacture, a planing-knife for circular saws, having a stem 6, recesses 8, formed in the opposite edges of the latter, said stem adapted to fit in a recess 14 formed in the saw, and means for holding said stem in said recess, substantially as set forth.

4. As a new article of manufacture, a planing-knife 5, having a stem 6, with recess 8 formed therein at its opposite edges, a blade 9, provided with a plane sharpened edge 10 and inclined sharpened edges 11, and means fitting in said recesses for securing said stem to the circular saw, substantially as set forth.

5. In a circular saw, the combination of insertible saw-teeth 2, thinner than the saw itself, a planing-knife 5, having a stem 6, with recesses 8 formed therein, a blade 9, provided with a plane sharpened edge 10, and inclined sharpened edges 11, said stem adapted to fit in a corresponding recess formed in the saw, and a semicircular metallic piece 3, provided with a rounded projection 13, adapted to fit in recess 8 for securing said insertible tooth and the said planing-knife to the saw, substantially as set forth.

6. In a saw, the combination of insertible saw-teeth, a planing-knife having a stem with recesses 8 formed therein at opposite edges, said stem being adapted to fit in a recess 14, formed in the saw, and a key or semicircular piece for each pair of adjacent knives and teeth, each piece and the saw being provided with projections fitting into the recesses of the planing-knives, substantially as set forth.

In witness whereof I affix my signature in presence of two witnesses.

ISAAC S. WILSON.

Witnesses:
H. TRIMBLE,
A. A. DRENNAN.